July 16, 1957 R. S. MEAD 2,799,480
ORNAMENTAL FENCE CONSTRUCTION
Filed April 8, 1954
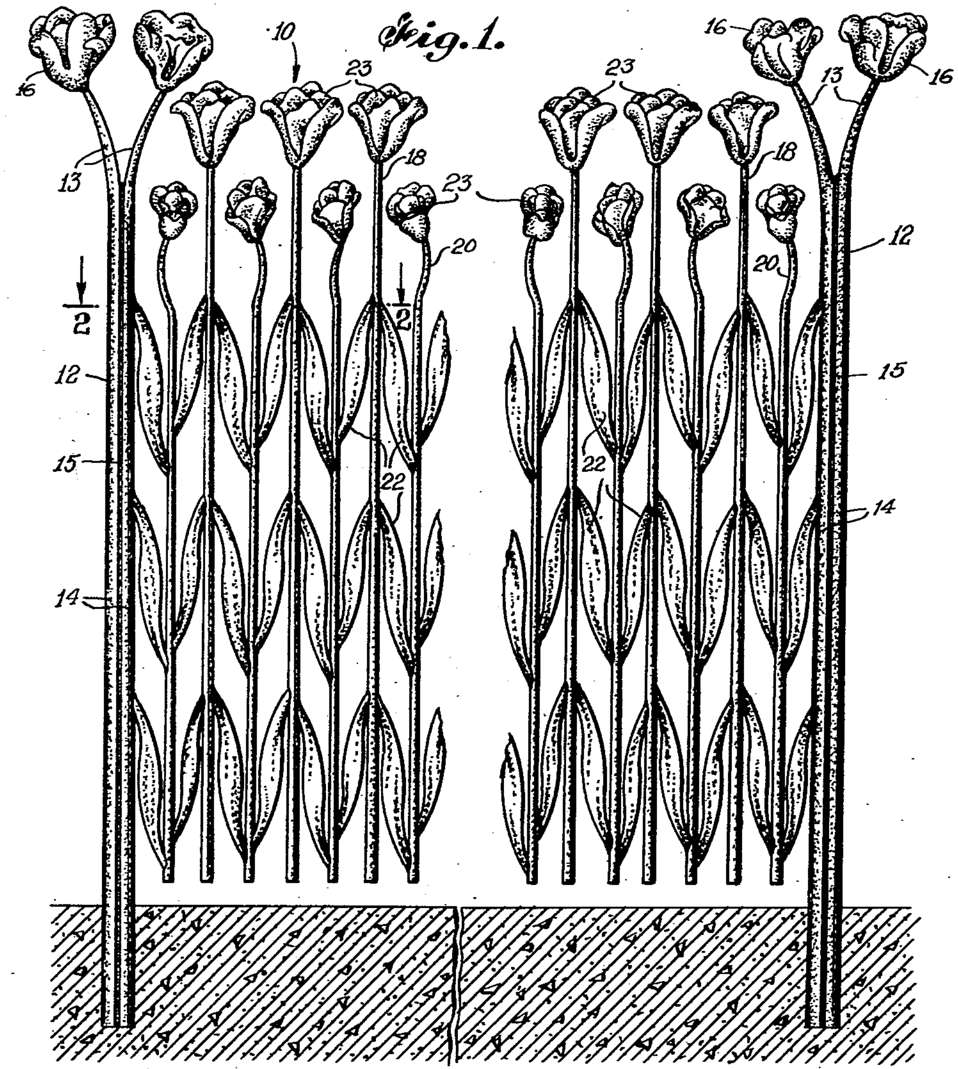

2,799,480

ORNAMENTAL FENCE CONSTRUCTION

Ruth Shillaber Mead, East Orange, N. J.; A. Reginald Mead, administrator of the estate of said Ruth Shillaber Mead, deceased Application April 8, 1954, Serial No. 421,854

6 Claims. (Cl. 256—19)

This invention relates to fence constructions and is more particularly concerned with an ornamental fence which may be assembled in sections to provide an enclosure of any desired shape and extent or to provide a line of demarcation between adjoining properties, or the like.

Conventional fences formed from wood or metal are effective insofar as forming a barrier or enclosure is concerned but they add little to the appearance of the landscape with which they are used and in general are considered to detract from its appearance. In an effort to overcome their adverse effect upon the surroundings, flowers, bushes and the like are planted along them so that the fence will be hidden from view as much as possible. While flowers and plants are attractive and beautify the landscape, they require extensive care and much time is needed for their proper cultivation. Oftentimes the soil adjacent the fence is not entirely suitable for cultivation and poor growth of the flowers or plants is the result. As a result, persons who cannot devote the necessary time to flower cultivation or who are confronted with poor soil must bear the detracting appearance of the conventional fence. While various attempts have been made to provide fences which are more attractive in their appearance, such proposals have not been entirely satisfactory for the reason that the proposed fences are unduly monotonous and regular in their appearance and, as a result, are not too great an improvement over the conventional wood or metal fence. Moreover, they are generally complicated in their construction and difficult to assembly properly and are not adapted for embodiment in a size which is suitable for preventing the passage of animals or small children. As a result, such fences cannot be used effectively to build play-yards for children, or as barriers to keep out animals such as dogs and the like.

It is an object of the invention to provide a fence which is useful for forming an effectvie barrier or enclosure yet which is attractive and decorative and enhances the appearance of the landscape in which it is used.

It is another object of the invention to provide a fence of the character indicated which is formed in readily assembled sections which may be easily and rapidly erected.

It is a further object of the invention to provide a decorative fence which has removable and changeable parts by means of which its appearance may be varied and a monotonous, regular appearance can be avoided.

It is another object of the invention to provide a fence of this nature which is economical to manufacture and which may be formed from long-lasting materials which require little maintenance.

In accordance with the invention there is provided a fence which is formed from posts which are adapted to be mounted in the ground in spaced-apart relationship, and panels which are received in the posts and retained against lateral displacement by them. The panels are formed from a plurality of vertical elements with interconnecting members extending between adjacent vertical elements, and decorative cap units removably secured to each of the vertical elements. In a preferred embodiment of the invention the vertical elements are of different heights with elements of a greater height interspersed between elements of lesser height. In providing the attractive, decorative appearance of the fence the posts are in the form of a cluster of flower stems, the vertical elements are in the form of individual flower stems, and the interconnecting members are in the form of leaves. The decorative cap units advantageously take the form of the heads of flowers. It will be understood that the particular form of the various members and elements may be varied at will but the relative relationship of the assembly of units which cooperate to provide the decorative fence of the invention lends itself readily to the particular forms specified.

It is a feature of the invention that the cap units may be made in different shapes and sizes and may be interchanged on the upper ends of the vertical elements to vary the appearance of the fence and prevent a monotonous effect.

It is another feature of the invention that the fence is readily adapted to be formed from plastics of various types and is therefore adapted to be embodied in a form which is decay-resistant, rust-resistant, and very durable. The characteristic structure and relative relationship of the parts of the fence lend themselves to fabrication by molding from a plastic material by any of the well-known techniques in the plastic field.

Other objects and features of the invention will be readily apparent from the following detailed description of an illustrative embodiment thereof and from the accompanying drawing, wherein:

Fig. 1 is a broken elevational view of a decorative fence construction embodying features of the present invention;

Fig. 2 is an enlarged cross-sectional view of the fence on an enlarged scale, taken approximately along the line 2—2 in Fig. 1; and Fig. 3 is a perspective view on an enlarged scale of one of the cap units partly broken away to show in detail the manner in which the cap unit may be removably connected with one of the vertical elements of the fence panel.

Referring to the drawing, and more particularly to Fig. 1, the reference numeral 10 designates generally the panel component of the fence illustrated and the numeral 12 refers to the vertical posts which support the panel. The posts, in the embodiment shown, represent the joined stems 13 of four flowers which give to the post rounded surfaces 14 joined by recesses 15. As shown in Fig. 2, the recesses 15 are accentuated and enlarged to a substantially rectangular cross-section. The upper ends of the posts 12 have caps which take the form of a group of four flowers 16, each flower 16 being carried by one of the stems 13. As shown in Fig. 1, each of the stems is inclined away from the center of its associated post so that the four flowers will lie substantially in a square. The lower ends of the posts 12 extend into the ground when the fence is erected outdoors and the posts are advantageously embedded in concrete to insure firm support.

Disposed between and supported by the posts 12 is the panel 10 which is formed by a plurality of long vertical elements 18 and a plurality of shorter vertical elements 20 arranged in alternating relationship with branch members 22 joining the vertical elements to form a unitary structure. In the embodiment illustrated, the vertical elements 18 and 20 take the form of substantially cylindrical flower stems and the branch members 22 are given the shape of leaves. As will be seen in Fig. 2, the leaf-form connecting members are not planar but have an undulating shape to simulate natural leaves. The number of vertical elements 18 and 20 will, of course, depend upon the desired length of the panel 10, the height of the vertical elements and the number of connecting members will depend upon the desired height of the panel. Advantageously, however, the connecting members are arranged at relatively close intervals to provide a strong structure. For example, corresponding points of vertically-adjacent connecting members are separated by not more than about ten inches.

Mounted at the top of each of the vertical elements is a cap unit 23 which is suitably in the form of a flower, e. g. a tulip, suitably colored. Thus, when the fence is erected, as shown in Fig. 1, with the flower-like cap units mounted on the vertical elements, the assembly gives the general appearance of a row of flowers, yet at the same time provides the mechanical barrier desired in a fence.

In accordance with the invention the cap units 16 and 23 are advantageously removably secured to the vertical stems 18 and 20 and the flowers 16 are similarly secured to the post stems 13. For this purpose the upper ends of stems 13, 18 and 20 are externally-threaded as indicated at 25 in Fig. 3, and corresponding internal threads 26 are provided in a recess 24 formed in each cap unit. An important advantage of the removable relationship of the cap units is that they may be interchanged or replaced by like units of different design, e. g. in the form of a different flower. In this manner the appearance of the panel 10 can be varied and the monotonous appearance of conventional fences can be avoided.

As will be seen in Fig. 2, the edges of the panel 10, as defined by the outer ends of the outermost connecting members 22 are received in the recesses 15 formed between the flower stems 13 which define the posts 12 for locking interengagement. By reason of the provision of recesses on all four sides of the posts, the panels can easily be connected to the post in colinear relationship or in right angular relationship and, therefore, the same posts may be used at the corners of the fence or in the main straight sections of the fence.

It will be understood that the fence construction of the invention may be made in a variety of sizes depending upon the particular purpose for which it is to be used. For a typical enclosure for the yard of a home, for example, the posts are suitably about three and one-half to four feet in length and about two or three inches in diameter. The panels to be used with these posts are suitably about nine feet in length and about two and one-half to three feet in height. Where the fence is to be used wholly for decorative purposes, e. g. around a tree or the like, the above indicated dimensions may suitably be halved. In addition to its being used as a yard enclosure or decoration, my fence may be used as a railing around window boxes or across window ledges and the like. The dimensions in this case are suitably selected to correspond with the requirements of these particular uses. I also contemplate use of the panels alone, if desired, any convenient means for supporting the panels being used.

One of the important practical advantages of my fence construction is that it readily lends itself to fabrication from various synthetic resinous materials or so-called plastics. By the use of such materials, incorporation of various, long-lasting colors is readily effected. While a variety of plastics may be employed, as will be apparent to those skilled in the plastics art, I have found particularly suitable a high-molecular weight polyvinyl chloride having the following characteristics:

| | |
|---|---|
| Specific gravity | 1.34. |
| Ultimate tensile strength (p. s. i.) | 5700. |
| Modulus of elasticity in flexure (p. s. i.) | $3.3\times10^{-5}$. |
| Flexural strength (p. s. i.) | 8400. |
| Hardness (Shore "D") | 77. |
| Heat distortion (° F.) | 151–158. |
| Heat expansion (coefficient of linear thermal expansion) (per ° C.$\times10^{-5}$) | $9.7\times10^{-5}$. |
| Water absorption (percent 24 hours at 25° C.) | 0.30. |
| Flame resistance | Self-extinguishing. |

One commercial form of a polyvinyl chloride of the above-indicated properties is sold under the trade designation "Alpha Forty" by Alpha Plastics, Inc. of West Orange, N. J.

Plastics, such as the above-mentioned material, are moldable and have favorable properties for out-door exposure. They are durable and their pleasant appearance is long-lasting. Posts and panels formed from plastics are not subject to rust or rot and do not require painting. A wide variety of colors can be permanently incorporated in the body of the plastic by techniques known in the plastics art. As a result, my fence construction may have portions colored blue, green, yellow, red or any other desired color. In a fence such as shown in Fig. 1, for example, the posts 12 and the vertical elements 18 and 20 will generally be brown, the leaf-shape connecting members 22 will be green and the cap units which are intended to simulate flowers will be red, yellow, blue and the like. By varying the colors of the cap units, a very attractive arrangement can be easily obtained.

The posts, the panels, and the cap units are fabricated in accordance with methods known in the plastics industry, e. g. by injection molding, and the like, suitable dies being provided for each portion of the structure. It will be understood that the invention is not limited to any particular method of fabrication or to any particular material of construction.

In some cases, particularly where minimum cost of materials is the primary consideration, my fence construction can be effectively formed from resin-bonded wood-waste. For this purpose, phenol-formaldehyde or urea-formaldehyde resins, either in liquid or powder form are particularly suitable. To form the molding composition for introduction into the molds for the fence components, the wood waste, e. g. sawdust, is mixed with at least 5% by weight, preferably 10–15% by weight of the resin, preferably a phenol-formaldehyde resin. A typical resin of this nature which is suitable for this purpose has the following characteristics:

| | | |
|---|---|---|
| Solids | percent by wt | 65–70 |
| Viscosity | cps | 300–800 |
| pH | | 7.5–8.0 |
| Specific gravity | | 1.20–1.30 |

This mixture is then molded under a pressure of 100–300 p. s. i. at a temperature of 300–350° F. The desired colors are incorporated in the molding mixture and thus are integral components of the finished product. Products made from wood waste are not as glossy as those made from resin alone and in order to increase the glossy appearance the products may be dipped in a colorless, transparent impregnating resin solution, e. g. a solution of a water-soluble phenol-formaldehyde resin, although this is not essential.

The posts and the vertical elements are shown as of solid construction but they may be hollow if desired, particularly when formed entirely from resin.

Although the fence may be erected merely by inserting the ends of the panels into the recesses in the posts which are driven into the ground, a firmer bond between the panels and the posts can be obtained either by means of an adhesive or by heat welding. Heat welding is readily effected by means of a soldering iron or the like, and any of various resin adhesives may be employed. I have found particularly satisfactory an adhesive formed by the interaction of resorcinol, or a mixture of phenol and resorcinol, with paraformaldehyde.

I thus provide a decorative, strong, long-lasting fence construction which may be rapidly and easily assembled to provide an enclosure, a retaining railing, a decorative border, or the like, with means for varying the appearance of the construction and avoiding the plainness and monotony of heretofore known fence constructions. My fence construction is three-dimensional in form and appearance and thus closely simulates a row of natural flowers.

It will be apparent to those skilled in the art that various changes and modifications may be made in the construction above-described and shown in the drawing without departing from the scope of the invention as defined in the appended claims, and it is intended, therefore, that all matter contained in the foregoing description and in the drawing shall be interpreted as illustrative only and not as limitative of the invention.

What I claim and desire to secure by Letters Patent is:

1. An ornamental colored plastic fence construction comprising a panel formed from a plurality of vertical elements simulating the stems of flowers in laterally spaced-apart relationship, said vertical elements being of different lengths with the longer elements being arranged in alternating relationship relative to the shorter elements, interconnecting members simulating leaves extending between adjacent vertical elements in vertically spaced-apart relationship, decorative cap units simulating flowers removably secured to the upper ends of the vertical elements, and at least one post simulating a plurality of flower stems grouped together and having at least one longitudinal groove adapted to receive the connecting members at the edge of the panel.

2. An ornamental colored plastic fence construction comprising a panel formed from a plurality of vertical elements simulating the stems of flowers in laterally spaced-apart relationship, said vertical elements being of different lengths with the longer elements being arranged in alternating relationship relative to the shorter elements, interconnecting members simulating leaves extending between adjacent vertical elements in vertically spaced-apart relationship, decorative cap units simulating flowers removably secured to the upper ends of the vertical elements, and at least one post simulating a plurality of flower stems grouped together and having a plurality of longitudinal grooves formed therein, each adapted to receive the connecting members at the edge of the panel, said longitudinal groove being positioned at the normal juncture of the simulated stems.

3. An ornamental colored plastic fence construction comprising a panel formed of a plurality of vertically extending round plastic stems having the appearance of stems of flowers, alternate stems being of different length, a plurality of molded plastic leaves integral with said stems, said leaves being united at their base portions with one stem and at their tip portions with the next adjacent stem, thereby uniting all of said stems and leaves into a panel, adjacent stems being thus interconnected with one another at a plurality of vertically spaced points to make said panel self supporting and a three-dimensional plastic flower carried by each of said stems.

4. An ornamental colored plastic fence construction comprising a panel formed of a plurality of laterally spaced, vertically extending round plastic stems having the appearance of flower stems, a plurality of molded plastic branch portions united at their bases with one stem and at their outer portions with adjacent stems, thereby uniting said stems and branch portions into a unitary panel, there being a plurality of vertically spaced branch portions united with each stem and adjacent stems being thus interconnected with one another at a plurality of vertically spaced points to make said panel self-supporting, and a three-dimensional plastic flower carried by each of said stems.

5. An ornamental colored plastic fence according to claim 4, in which said flowers are removably affixed to the upper ends of said stems.

6. An ornamental colored plastic fence construction comprising a pair of laterally spaced supports and a panel extending between said supports, said panel being formed of a plurality of laterally spaced, vertically extending round plastic stems having the appearance of flower stems, a plurality of molded plastic branch portions on each stem, said branch portions being united at their bases with one stem and at their outer portions with adjacent stems, thereby uniting said stems and branch portions into a unitary panel, means connecting opposite ends of said panel to said supports respectively, there being a plurality of vertically spaced branch portions united with each stem and adjacent stems being thus interconnected in fixed relation with one another at a plurality of vertically spaced points to make said panel self-supporting between said supports, and a three-dimensional plastic flower carried by each of said stems.

References Cited in the file of this patent

UNITED STATES PATENTS

| | | |
|---|---|---|
| 372,254 | Cooper | Oct. 25, 1887 |
| 1,160,728 | Liggett | Nov. 16, 1915 |
| 1,985,322 | LaClair | Dec. 25, 1934 |
| 2,628,823 | Rhome et al. | Feb. 17, 1953 |
| 2,670,182 | Oberwerger | Feb. 23, 1954 |